(12) United States Patent
Khoo et al.

(10) Patent No.: US 8,983,513 B2
(45) Date of Patent: Mar. 17, 2015

(54) METHOD AND APPARATUS FOR SENDING A CHANNEL TIMING MESSAGE IN A DIGITAL MOBILE RADIO SYSTEM

(75) Inventors: Hun Weng Khoo, Penang (MY); Yueh Ching Chung, Georgetown (MY); David G. Wiatrowski, Woodstock, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1126 days.

(21) Appl. No.: 12/957,009

(22) Filed: Nov. 30, 2010

(65) Prior Publication Data
US 2012/0135765 A1 May 31, 2012

(51) Int. Cl.
*H04B 7/00* (2006.01)
*H04L 7/00* (2006.01)
*H04W 56/00* (2009.01)
*H04W 72/12* (2009.01)
*H04W 84/20* (2009.01)

(52) U.S. Cl.
CPC ...... *H04W 56/0015* (2013.01); *H04W 72/1278* (2013.01); *H04W 84/20* (2013.01); *H04W 56/0075* (2013.01)
USPC ........... 455/507; 455/502; 455/515; 375/356; 375/357

(58) Field of Classification Search
CPC .......... H04W 72/1278; H04W 74/002; H04W 74/0891; H04W 84/18; H04W 84/20; H04W 56/001; H04W 56/0015
USPC ......... 455/434, 436, 502, 507, 512, 513, 515; 375/354, 356, 357
See application file for complete search history.

(56) References Cited

U.S. PATENT DOCUMENTS

| | | | | |
|---|---|---|---|---|
| 5,691,980 A * | 11/1997 | Welles et al. | | 370/316 |
| 7,447,503 B2 * | 11/2008 | Shvodian | | 455/435.2 |
| 7,587,465 B1 * | 9/2009 | Muchow | | 709/209 |
| 7,849,150 B2 * | 12/2010 | Loeebbert et al. | | 709/208 |
| 8,457,553 B2 * | 6/2013 | Dharmaraju et al. | | 455/41.2 |
| 8,572,222 B2 * | 10/2013 | Sakai et al. | | 709/223 |
| 2002/0055978 A1 * | 5/2002 | Joon-Bo et al. | | 709/209 |
| 2004/0196872 A1 * | 10/2004 | Nakamura | | 370/512 |
| 2004/0218580 A1 * | 11/2004 | Bahl et al. | | 370/350 |
| 2004/0255001 A1 * | 12/2004 | Oh et al. | | 709/209 |
| 2007/0249341 A1 * | 10/2007 | Chu et al. | | 455/434 |
| 2009/0170546 A1 * | 7/2009 | Nishida | | 455/517 |

FOREIGN PATENT DOCUMENTS

EP 1487155 12/2004

OTHER PUBLICATIONS

International Search Report and Written Opinion dated Feb. 24, 2012 in related case PCT/US2011/059931.

\* cited by examiner

*Primary Examiner* — Duc M Nguyen
(74) *Attorney, Agent, or Firm* — Barbara R. Doutre

(57) ABSTRACT

A method and apparatus for automatically switching functions associated with a leading radio to another radio on a channel is disclosed. The method includes receiving, from a leading radio by at least one other radio operating on a channel, an associated timing signal via at least one control timing message. Other radios use the timing signal to synchronize transmissions made on the channel. The method also includes receiving, by the other radios, an indication that the leading radio can no longer provide control timing messages. The method further includes maintaining, by each radio on the channel, values for various elements associated with radios operating on the channel and selecting a new leading radio from the other radios based on priorities of the various elements.

20 Claims, 4 Drawing Sheets

| RADIO 201 | STATUS 202 | SUBSCRIBER IDENTIFIER 204 | RADIO TYPE 206 | TIMESLOT 210 | SYNCHRONIZATION 212 |
|---|---|---|---|---|---|
| 106 | LEADER | 23 | HIGH PREFERENCE LEADER | 102 | 60 SEC |
| 110 | 1ST BACKUP | 8 | HIGH PREFERENCE LEADER | 102 | 65 SEC |
| 108 | 2ND BACKUP | 30 | NORMAL PREFERENCE LEADER | 104 | 60 SEC |
| 112 | 3RD BACKUP | 10 | NORMAL PREFERENCE LEADER | 104 | 70 SEC |
| 116 | 4TH BACKUP | 50 | EXCLUDE FROM LEADER SELECTION | 104 | 60 SEC |
| 114 | 5TH BACKUP | 5 | EXCLUDE FROM LEADER SELECTION | 104 | 75 SEC |

| RADIO 201 | STATUS 202 | SUBSCRIBER IDENTIFIER 204 | RADIO TYPE 206 | TIMESLOT 210 | SYNCHRONIZATION 212 |
|---|---|---|---|---|---|
| 106 | LEADER | 23 | HIGH PREFERENCE LEADER | 102 | 60 SEC |
| 110 | 1ST BACKUP | 8 | HIGH PREFERENCE LEADER | 102 | 65 SEC |
| 108 | 2ND BACKUP | 30 | NORMAL PREFERENCE LEADER | 104 | 60 SEC |
| 112 | 3RD BACKUP | 10 | NORMAL PREFERENCE LEADER | 104 | 70 SEC |
| 116 | 4TH BACKUP | 50 | EXCLUDE FROM LEADER SELECTION | 104 | 60 SEC |
| 114 | 5TH BACKUP | 5 | EXCLUDE FROM LEADER SELECTION | 104 | 75 SEC |

*FIG. 2*

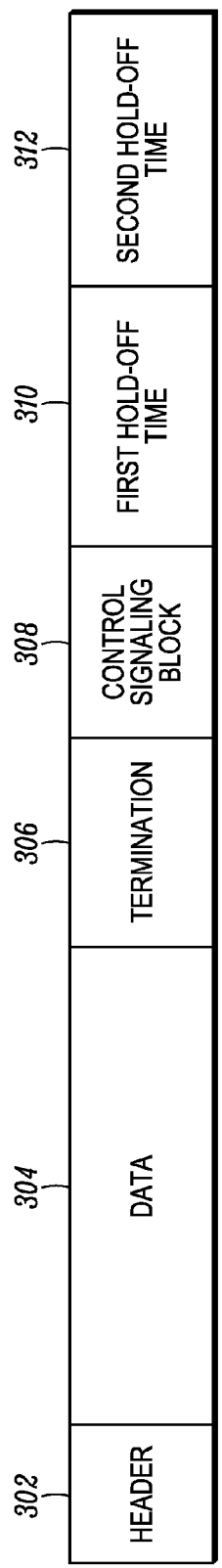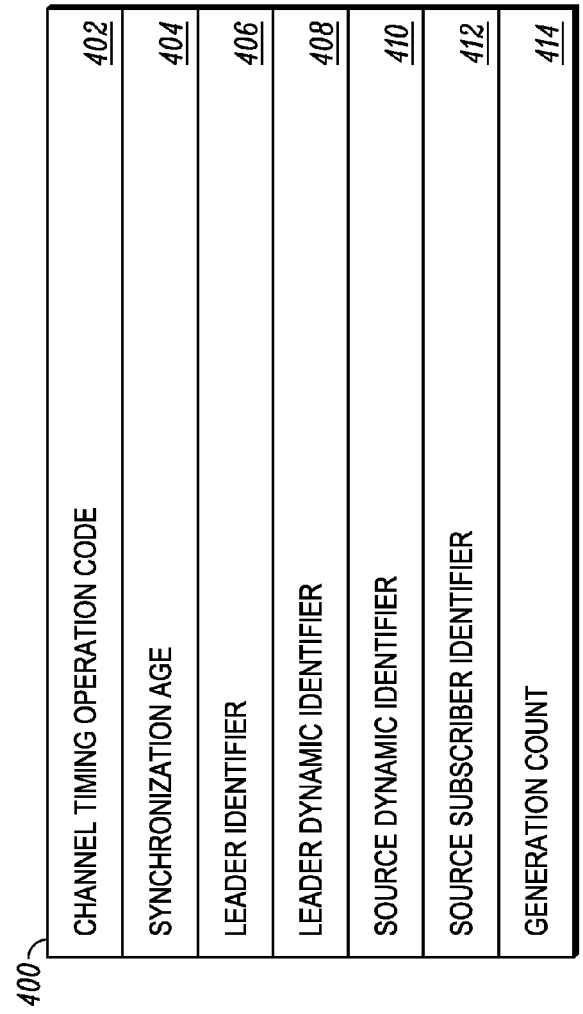
FIG. 3
FIG. 4

METHOD AND APPARATUS FOR SENDING A CHANNEL TIMING MESSAGE IN A DIGITAL MOBILE RADIO SYSTEM

FIELD OF THE DISCLOSURE

The present disclosure relates generally Digital Mobile Radio (DMR) communications and more particularly to automatically switching functions of a leading radio to another radio operating on a channel of a Digital Mobile Radio (DMR) system.

BACKGROUND

In response to a growing need to improve the efficiency of radio communications systems, a Digital Mobile Radio (DMR) communications standard establishes protocols and other system requirements for communications on private mobile radios. Any DMR standards or specifications referred to herein may be obtained by contacting ETSI at ETSI Secretariat, 650, Route des Lucioles, 06921 Sophia-Antipolis Cedex, FRANCE. Private mobile radios include radios, other than mobile telephones, such as mobile radios, portable radios, and the like. The DMR standard supports simultaneous and independent calls on a single channel. In particular, according to the standard, a 12.5 Kilohertz (kHz) channel is divided into two alternating timeslots. Each timeslot acts as a separate communications path for two or more radios, where each radio operating on the channel communicates on an assigned timeslot.

Radios operating on the channel synchronize traffic on the channel by using a timing reference. To minimize channel traffic associated with radios requesting the timing reference when there is no timing reference signal for radios operating on the timeslots on the channel, one radio operating on the channel is selected as a channel timing leader. The channel timing leader intermittently transmits a timing signal in at least one channel timing (CT) message to other radios operating on the channel. The other radios operating on the channel adjust their transmission clocks based on the timing signal transmitted from the timing leader.

The timing leader typically transmits the CT message at predefined intervals over a long period. However, constant beaconing of the CT message by the timing leader can impact the longevity of the timing leader's power source if, for example, the power source is a battery. The timing leader is also subject to move out of range or otherwise fail. There is currently no efficient manner to transition the functions of the timing leader from one radio to another radio operating on the channel.

Accordingly, there is a need for a method and apparatus for automatically switching the functions of the timing leader radio to another radio operating on the channel.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 2 is a block diagram of elements used by radios in selecting a new leading radio in accordance with some embodiments.

FIG. 3 is a block diagram of a data packet transmitted from a radio in accordance with some embodiments.

FIG. 4 is a block diagram of a timing reference message in accordance with some embodiments.

Figure 1:
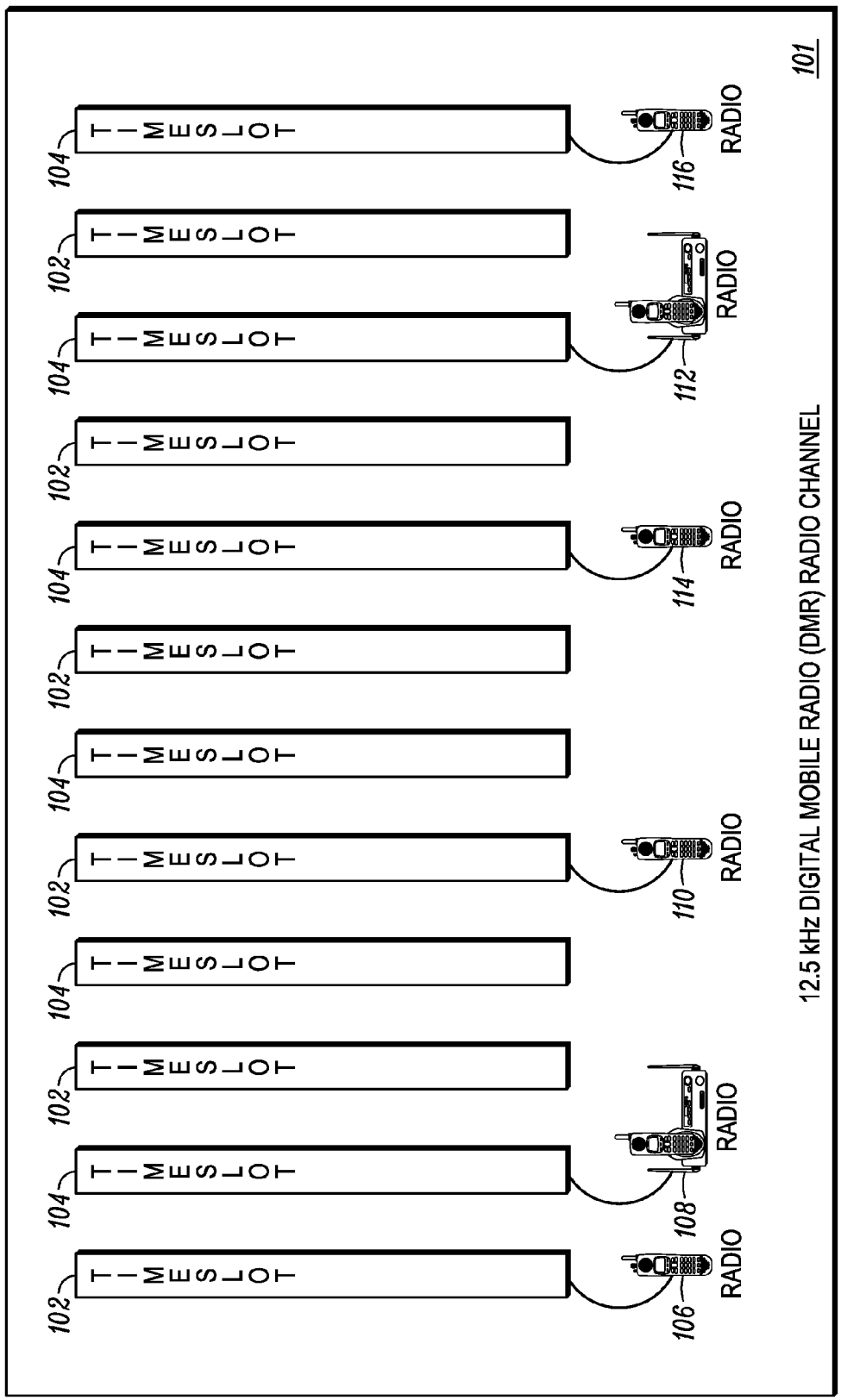
FIG. 1 is a block diagram of a channel with separate communications paths in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some embodiments are directed to methods and apparatuses for automatically switching functions associated with a leading radio to another radio operating on a channel. The method includes receiving, from a leading radio by at least one other radio operating on a channel, an associated timing signal via at least one control timing message. Other radios use the timing signal to synchronize transmissions made on the channel. The method also includes receiving, by the other radios, an indication that the leading radio can no longer provide control timing messages. The method further includes maintaining, by each radio on the channel, values for various elements associated with radios operating on the channel and selecting a new leading radio from the other radios based on priorities of the various elements.

FIG. 1 illustrates a Digital Mobile Radio (DMR) channel with separate communications paths in accordance with some embodiments. As is known to those skilled in the art, a DMR channel is a 12.5 Kilohertz (kHz) channel where assigned radios can make two simultaneous and independent calls using, for example, a Time Division Multiple Access (TDMA) protocol. DMR channel 101 is divided into two alternating timeslots 102 and 104 each of which acts as a separate communications path between two or more radios. Examples of radios used in some embodiments include mobile radios, portable radios, control stations, and the like. As shown in FIG. 1, radios 106 and 110 are configured to communicate on timeslot 102 and radios 108, 112, 114 and 116 are configured communicate on timeslot 104. In this arrangement, each communication path is active for half of the time in 12.5 kHz of bandwidth. This enables radios 106-116 to operate with existing licensed 12.5 kHz channels, while doubling the capacity of channel 101. It should be noted that although the discussion is direct to using TDMA protocol, some embodiments may use Frequency Division Multiple Access (FDMA) protocol or another similar protocol.

In each channel, one radio is selected as the leading radio. The leading radio transmits channel timing (CT) messages to other radios operating on the channel. The leading radio transmits the CT messages following its DMR TDMA timeslot alignment. Each radio operating on the channel includes a TDMA timeslot timer and a synchronization algorithm, where the leading radio's timeslot alignment is maintained by its TDMA timeslot timer and synchronization algorithm. The TDMA timeslot timer and the radio synchronization algorithm determine, for example, the timing boundaries for timeslot 102 and timeslot 104. When other radios operating on the channel receive CT messages from the leading radio, the synchronization algorithm in each of the other radios is used to determine a synchronization pattern timing which is transmitted in the middle of each CT message. The synchronization pattern timing in each of the other radios is passed to an associated TDMA timeslot timer. The TDMA timeslot timer in each of the other radios compares the received synchronization pattern timing with an expected synchronization pattern timing. If there is a difference between the received synchronization pattern timing and the expected synchronization pattern timing, the TDMA timeslot timer in each of the other radios adjusts its timing to match that of the leading radio.

The CT message may be one or more (CT) control signaling block (CSBK) messages. In some embodiments, the leading radio sends three CT CSBK messages when it sends the synchronization timing signal to other radios operating on the channel to ensure that radios operating in battery saver mode reliably receive the CT message. In other embodiments, the leading radio sends six Preamble CSBKs (as defined in the ETSI DMR standard ETSI TS 102 361-2) followed by one CT CSBK message to ensure that radios operating in a scan mode can properly receive the CT message. In general, the leading radio sends N Preamble CSBKs followed by M CT CSBK messages where $N \geq 0$ and $M \geq 1$. As mentioned previously, ETSI DMR standard ETSI TS 102 361-2 may be obtained by contacting ETSI at ETSI Secretariat, 650, Route des Lucioles, 06921 Sophia-Antipolis Cedex, FRANCE.

Each radio 106-116 operating on channel 101 is associated with a particular radio type. Examples of descriptions associated with various radio types include a high preference leader description, a normal preference leader description, a low preference leader description and an "exclude from leader selection" description. The high preference leader description is applied to those radios connected to a constant power source. As such, radios described as high preference leaders do not have power source limitations associated with, for example, a battery that can lose a large percentage of its charge when used for certain periods. Therefore, a radio described as a high preference leader is capable of transmitting the CT messages for long intervals, without impacting the longevity of the associated power source. A control station is an example of a radio that may be described as a high preference leader because it is typically connected to a constant power source, it has a high transmit power and a high-mounted antenna, and it is typically in a stationary location, all of which serve to reliably and efficiently disseminate channel timing information over a wide area. A mobile radio may also be described as a high preference leader because it is typically connected to a constant power source and has a high transmit power.

A radio described as a normal preference leader is one that can transmit the CT messages for predefined periods. A portable radio is an example of a radio that is likely to be described as a normal preference leader when it is not operating in scan mode. The low preference leader description is applied to those radios less suitable to being a leading radio than radios described as normal preference leaders. A portable or mobile radio operating in scan mode is an example of a radio that is likely to be described as a low preference leader because the radio is not continually operating on the channel for which it would need to provide channel timing leadership (i.e., it is scanning other channels). In some embodiments, radios described as high preference leaders are given a higher priority over those described as normal preference leaders and low preference leaders when a new leading radio is being selected. Similarly, radios described as normal preference leaders are given higher priority over those radios described as low preference leaders.

A radio 106-116 may be excluded from consideration during selection of the leader radio if the radio provides an indication that it may be unable to perform the functions of the leading radio. For example, when a radio which receives its power from a battery source performs the functions of the leading radio for a predefined period or sends a predefined number of CT messages, the radio may set the radio type field to describe the radio as one that prefers to be excluded from the leader selection. In some embodiments, the leading radio may announce in the CT messages that it does not want to be the leading radio. For example, if the leading radio is programmed to send a predetermined number of CT messages to, for example minimize the impact on the power source, the radio may announce that it cannot be the leading radio after transmission of the predetermined number of messages. The radio may also announce that it cannot be the leading radio, for example, prior to powering down or changing channels. On the other hand, a radio may also announce that it can be a leading radio. For example, a new control station operating on the channel may send out a message that it can be the leading radio for the channel.

Radios 106-116 operating on channel 101 are each assigned a source subscriber identifier. The source subscriber identifier is a unique number which is used in determining priority when selecting the new leading radio. As an alternative to using the source subscriber identifier for determining priority when selecting the new leading radio, other data values may be used. Examples of other data values used as alternatives to the source subscriber identifier include a radio's provisioned serial number, a radio's electronic serial number, a radio's hashed codeplug (i.e., hash key of the codeplug), or a codeplug value provisioned exclusively for determining priority when selecting a new leading radio.

Each radio 106-116 is also associated with a field that indicates a synchronization age of the leading radio. The synchronization age indicates an elapsed period from when the leading radio last transmitted CT message(s) to refresh the channel timing. When the leading radio transmits CT messages to other radios operating on the channel, the synchronization age value is set to zero. If the CT message is delayed, due to the channel being busy for example, the synchronization age is set to a value that indicates the time elapsed since the leader was supposed to have transmitted the CT message. Upon receipt of the CT message, each radio determines whether the contents of the recently received CT message are better than the information currently stored by the radio. If the recently received contents are better, the radio records a received synchronization age value and increases that synchronization age value with time. Contents of the received CT message may be considered better if, for example, the value of a leader identifier is larger, the value of the synchronization age is smaller, the value of a generation is smaller, or a preference associated with a leader dynamic leader identifier is higher. The generation value indicates the number of times a leading radio timing has been propagated from one radio to another.

For example in FIG. 1, radio 106 is initially selected as the leading radio. In order to automatically select a new leading radio when radio 106 is no longer able to function as the leading radio, each radio 106-116 operating on channel 101 maintains values for elements associated with radios observed to be operating on the channel. Radios 106-116 use the values of these elements to determine which of remaining radios 108-116 operating on channel 101 is to be selected as the new leading radio.

FIG. 2 is a block diagram of a table with elements used by radios 106-116 in selecting a new leading radio in accordance with some embodiments. It should be apparent to one skilled in the art that other fields and values may be included in table 200. It should be noted that each radio 106-116 separately creates and maintains table 200 based on its observations of activities on the channel or based on information received from other radios. It should also be noted that each radio may be configured to store the elements described in table 200 in different locations. Considering table 200 with elements shown in FIG. 1, each row in table 200 includes values associated with a specific radio operating on channel 101. In particular, each row includes values for a source subscriber identifier field 204, a radio type field 206, a timeslot field 210, and a synchronization age field 212. A new row is added to table 200 after a new radio operating on channel 101 transmits initial information on the channel.

The source subscriber identifier field 204 value is a unique value that is used to prioritize radios when selecting a new leading radio. The radio type field 206 value is used to describe the radio as, for example, a high preference leader, a normal preference leader, a low preference leader, or one that wants to be excluded from leader selection. The value in the timeslot field 210 indicates the channel timeslot 102 or 104 on which the radio is configured to communicate. The value in the synchronization age field 212 indicates an elapsed period of time from when the leading radio last refreshed the channel timing as reported in the CT message transmitted by the subscriber indicated in 204.

Note that one or more radios operating on the channel may not be in the range of the leading radio. According, when the leading radio transmits the CT messages, other radios operating on the channel receive the CT messages and eventually relay the CT messages with the leading radio timing and synchronization age to other radios operating on the channel. In particular, when non-leading radios 108-116 operating on channel 101 transmit a voice or data packet, a CT message field in the packet sent by non-leading radios 108-116 includes a leading radio identifier and a current synchronization age value. Therefore, if other non-leading radios have not synchronized their transmissions to that of the leading radio 106, the other non-leading radios 108-116 may synchronize their transmissions by using the synchronization information in the packet sent from another non-leading radio.

The radio column 201 in table 200 identifies each radio associated with a specific row. The row for the current leader radio is deleted from table 200 when the current leader's synchronization period expires. The row for a newly determined leader is also deleted if no CT message is received from the newly determined leader within a predefined period. This allows radios operating on channel 101 to select another radio as the new leader. In some embodiments, rows for those radios described through radio type 206 as wanting to be excluded from leader selection are not deleted from table 200.

When leading radio 106 is active, it is configured to transmit a timing signal through the CT messages during a hold-off time and when the channel is idle. The hold-off time includes a first hold-off period when leading radio 106 can transmit CT messages to other radios 108-116 operating on the channel and a second hold-off period which is a random period, after the first hold-off period expires, when a new leading radio can transmit CT messages on the channel. The hold-off time begins after other radios 108-116 receive the CT messages. The channel is idle when both timeslots 102 and 104 on channel 101 have no activities, that is, when no radio operating on channel 101 is transmitting information on any timeslot. Transmission of the CT messages during idle periods ensures that radios using both timeslots can receive the CT messages. Upon receiving CT messages, other radios 108-116 use the timing signal obtained from the CT messages transmitted by leading radio 106 to synchronize their subsequent transmissions on all timeslots on the channel.

The leading radio 106 may elect to send the CT messages multiple times in a synchronization period. The synchronization period is a period during which leading radio may send CT messages. For example, if the synchronization period for leading radio 106 is set to sixty (60) seconds, leading radio 106 may elect to send three (3) timing messages in a single synchronization period, that is, CT messages every twenty (20) seconds. In another example, leading radio 106 may elect to send CT messages at a particular point in the synchronization period. For example, leading radio 106 may elect to send the CT messages during the $50^{th}$ second of the synchronization period. Upon receiving the CT messages from leading radio 106 or from another radio 108-116, each radio 108-116 updates associated elements of table 200. When CT messages are received from non-leading radios 108-116, the leading radio's synchronization age is reset to the received value, if it is better than the value stored currently, and is then dynamically incremented with time. Each radio 108-116 operating on channel 101 also updates its channel timing to reflect timing associated with the recently received CT messages, if it is a better timing signal.

The synchronization age of leading radio 106 may expire if the leading radio is unable to transmit the CT messages during the synchronization period. Leading radio 106 may be unable to transmit the CT messages if, for example, leading radio 106 is tuned to a different channel by a user, leading radio 106 is switched off, out of range, transmits a weak signal due to environmental conditions, or leading radio 106 is otherwise unavailable. Leading radio 106 may also be unable to transmit the CT messages if channel 101 is busy.

FIG. 3 is a block diagram of a data packet transmitted from a radio (leading or non-leading) in accordance with some embodiments. The data packet 300 includes one or more header fields 302, a data field 304, a termination field 306, a CSBK field 308 and a hold-off time fields 310 and 312. The header field 302 includes control information used for setting up a voice or data call with one or more radios. The data field 304 includes voice communication or text data transmitted from a radio to another radio operating on the channel. The termination field 306 indicates the end of the voice/text data. The CSBK field 308 includes CT control signaling block (CSBK) messages. During the first hold-off time identified in field 310 the leading radio transmits the CT CSBK messages. The second hold-off time identified in field 312 is a random period which begins after the first hold-off time has expired. A new leading radio can transmit CT messages during the second hold-off time if the current leading radio does not send the CT messages during the first hold-off time and if the synchronization period associated with the leading radio has expired. This random period avoids collision if multiple radios attempt to become the new leading radio. If the synchronization period associated with the leading radio has expired and the hold-off time provided in field 310 has also expired without the leading radio sending out the CT messages, a new leading radio is selected. The new leading radio thereafter sends a timing signal in CT messages on its associated timeslot and the other radios adjust their transmission timing to the timing derived from the CT messages transmitted from the new leading radio.

Returning to FIG. 1 and FIG. 2, assume for the sake of describing the selection process that the contents of table 200 remain unchanged as new leading radios are selected. When the synchronization period of leading radio 106 has expired and the first hold-off time has also expired, one of the remaining radios 108-116 operating on channel 101 is selected as the new leading radio. In some embodiments, selection of the new leading radio is prioritized based on the associated value in radio type field 206. For example, radio 110 described as a high preference leader is given a higher priority over those radios 108, 112 described as normal preference leaders. If two or more radios have the same radio type description, the new leading radio selection is prioritized based on the value in subscriber identifier field 204. In some embodiments, a radio with a higher subscriber identifier value is given a higher priority.

Based on the contents of table 200, when the synchronization age of leading radio 106 expires and the first hold-off time also expires, radio 110 is selected as the new leading radio because it is the only other radio in table 200 that is described as a high preference leader. When the synchronization age of leading radio 110 expires and the first hold-off time also expires, assuming for the sake of describing the selection process that the contents of table 200 remain unchanged, radio 108 is selected as the new leading radio. That is because radio 108 has the highest subscriber identifier of those radios described as normal preference leaders. When leading radio 108 can no longer function as the leading radio, radio 112 is selected as the new leading radio because it has the highest subscriber identifier of the remaining radios identified as normal preference leaders.

According to some embodiments, each radio maintains elements described in table 200 and sorts those elements based on the values in the radio type field and the subscriber identifier field. Based on the sorted table, a status 202 is assigned to each radio and, in some embodiments, the new leading radio is automatically selected based on its status.

FIG. 4 is a block diagram of a CT message used in accordance with some embodiments. CT message 400 includes fields that are associated with a channel timing operation code 402, a synchronization age 404, a leader identifier 406, a leader dynamic identifier 408, a source dynamic identifier 410, a source subscriber identifier 412, and generation count 414. It will be appreciated by one skilled in the art that other fields and values may be included in CT message 400.

The value associated with the channel timing operation code 402 identifies the message as a CT message. The synchronization age 404 value indicates an elapsed period of time from when the leading radio identified by identifier 406 last refreshed the channel timing as viewed by or known to the radio transmitting the CT message. The leader identifier 406 value is set to that of the source subscriber identifier 412 of the leading radio. The value of leader dynamic identifier 408 field defines a preference level of the leading radio. The value of source dynamic identifier 410 field defines the associated values for radio type field 206, as described above in FIG. 2. For example, a value of "00" in source dynamic identifier 410 indicates that the radio is using an aliased ID or due to power saving consideration, the radio would like to be excluded from consideration during selection of the leading radio. A value of "01" and "10" in source dynamic identifier 410 indicate that the radio is a low preference leader and normal preference leader, respectively. A value of "11" in the source dynamic identifier 410 indicates that the radio is a high preference leader. The generation count 414 value is used to indicate the number of times a leading radio timing has been propagated from one radio to another.

Figure 5:
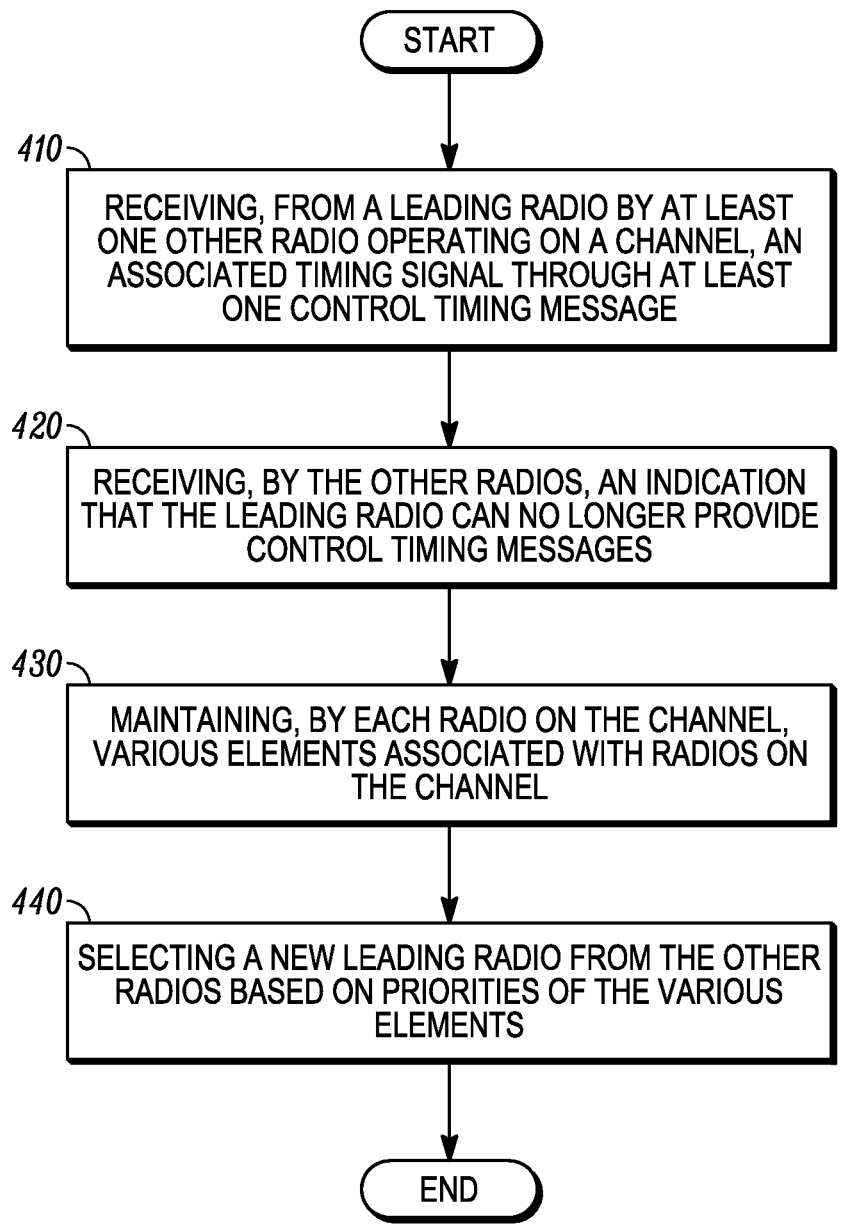
FIG. 5 is a flowchart of a method of automatically switching functions of a leading radio in accordance with some embodiments.

FIG. 5 is a flowchart of a method for automatically switching functions associated with the leading radio to another radio operating on the channel. In 410, at least one other radio operating on a channel receives, from a leading radio, an associated timing signal through at least one control timing message. Other radios use the timing signal to synchronize transmissions made on the channel. In 420, the other radios receive an indication that the leading radio can no longer provide control timing messages. In 430, each of the other radios operating on the channel maintains various elements associated with radios operating on the channel. In 440, a new leading radio is selected from the other radios based on priorities of the various elements.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for automatically switching functions associated with a leading radio to another radio operating on a channel comprising:
   receiving, from a leading radio by at least one of a plurality of other radios operating on a channel, an associated timing signal via at least one control timing message, wherein the at least one of the plurality of other radios use the timing signal to synchronize transmissions made on the channel;
   receiving, by the at least one of the plurality of other radios, an indication that the leading radio can no longer provide control timing messages;
   maintaining, by each of the plurality of other radios operating on the channel, values for various elements associated with each of the plurality of other radios operating on the channel, wherein the various elements include at least a field indicating a preference of each of the plurality of other radios for selection as a new leading radio; and
   selecting, by the at least one of the plurality of other radios, the new leading radio from the plurality of other radios based on priorities of the various elements.

2. The method according to claim 1, wherein the maintaining comprises maintaining values for a subscriber identifier field, a radio type field including the field indicating the preference of the each of the other radios for selection as the new leading radio, a timeslot field, and a synchronization age field.

3. The method of claim 2, wherein upon receiving the control timing messages, the method further comprises using, by the one or more plurality of other radios, the value in the synchronization age field associated with the leading radio.

4. The method of claim 2, wherein the selecting comprises selecting the new leading radio based on prioritized values in the radio type field.

5. The method of claim 4, wherein if at least two of the plurality of other radios have the same value in associated radio type fields, the selecting comprises selecting the new leading radio based on prioritized values in the subscriber identifier field.

6. The method of claim 2, wherein each of the plurality of other radios operating on the channel sorts the various elements based on values in the radio type field and the subscriber identifier field and associates a status field with each of the plurality of other radios.

7. The method of claim 6, wherein the selecting comprises automatically selecting the new leading radio according to the value in the status field.

8. The method of claim 1, wherein the receiving the associated timing signal further comprises receiving a predefined number of control timing messages from the leading radio during a synchronization period.

9. The method of claim 8, wherein the receiving an indication comprises receiving no control timing messages from the leading radio during the synchronization period and a hold-off period.

10. The method of claim 1, further comprising transmitting, by the one or more at least one of the plurality of other radios, a timing reference message in a packet, wherein the timing reference message includes a timing signal transmitted from the leading radio.

11. The method of claim 1, further comprising receiving, by the one or more at least one of the plurality of other radios, the control timing messages transmitted from the leading radio during a hold-off time and when the channel is idle.

12. The method of claim 1, further comprising synchronizing, by the one or more at least one of the plurality of other radios, transmissions on all timeslots on the channel based on the control timing messages transmitted from the leading radio in an assigned timeslot.

13. The method of claim 1, further comprising allowing at least one of the plurality of other radios to transmit an announcement that it can be the new leading radio.

14. The method of claim 1, wherein the selecting further comprises:
   determining, by the at least one of the plurality of other radios, a priority for each of the plurality of other radios based on the values for various elements associated with each of the plurality of other radios operating on the channel; and
   selecting, by the at least one of the plurality of other radios, the new leading radio from the plurality of other radios based on the priority determined for each of the plurality of other radios.

15. The method of claim 1, wherein the maintaining further comprises:
   receiving, by each of the plurality of other radios, values for the various elements associated with the at least one other radio of the plurality of other radios from the at least one other radio of the plurality of other radios; and maintaining, by each of the plurality of other radios operating on the channel, the received values.

16. A system configured to automatically switch functions associated with a leading radio to another radio operating on a channel, the system comprising:
a leading radio; and
at least one a plurality of other radios operating on a channel,
wherein the leading radio is configured to transmit an associated timing signal by transmitting at least control timing message to at least one of the plurality of other radios, wherein one or more the at least one of the plurality of other radios use the timing signal to synchronize transmissions made on the channel, and
wherein each of the one or more plurality of other radios is configured to receive an indication that the leading radio can no longer provide the control timing messages, to maintain values for various elements associated with one or more each of the plurality of other radios operating on the channel, and to select a new leading radio from the plurality of other radios based on priorities of the various elements, further wherein the various elements include at least a field indicating a preference of each of the plurality of other radios for selection as the new leading radio.

17. The system according to claim 16, wherein each of the plurality of other radios is configured to maintain values for a subscriber identifier field, a radio type field including the field indicating the preference of the each of the other radios for selection as the new leading radio, a timeslot field, and a synchronization age field.

18. The system according to claim 17, wherein each of the one or more plurality of other radios is configured to select the new leading radio based on prioritized radio type values, wherein if at least two of the other radios have the same value in the radio type field, the one or more plurality of other radios are configured to select the new leading radio based on prioritized values in the subscriber identifier field.

19. The system of claim 16, wherein each of the plurality of other radios operating on the channel is configured to sort the various elements based on values in the radio type field and the subscriber identifier field, and to associate a status field with each radio, wherein the one or more plurality of other radios are configured to select the new leading radio according to a value in the status field.

20. The system of claim 16, wherein each of the plurality of other radios is further configured to determine a priority for each of the plurality of other radios based on the values for various elements associated with each of the plurality of other radios operating on the channel and select the new leading radio from the plurality of other radios based on the priority determined for each of the plurality of other radios.

* * * * *